(12) United States Patent
Hiei et al.

(10) Patent No.: US 12,084,047 B2
(45) Date of Patent: Sep. 10, 2024

(54) VEHICLE DRIVING ASSIST SYSTEM

(71) Applicant: TOYOTA JIDOSHA KABUSHIKI KAISHA, Toyota (JP)

(72) Inventors: Yu Hiei, Chiryu (JP); Daiki Maruki, Toyota (JP); Miho Shiotani, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/969,044

(22) Filed: Oct. 19, 2022

(65) Prior Publication Data

US 2023/0125351 A1 Apr. 27, 2023

(30) Foreign Application Priority Data

Oct. 22, 2021 (JP) ................................ 2021-173339

(51) Int. Cl.
| | |
|---|---|
| *B60W 30/06* | (2006.01) |
| *B60R 1/22* | (2022.01) |
| *B60W 30/18* | (2012.01) |
| *B60W 50/14* | (2020.01) |
| *G06T 7/73* | (2017.01) |
| *G06V 20/58* | (2022.01) |

(52) U.S. Cl.
CPC ............... *B60W 30/06* (2013.01); *B60R 1/22* (2022.01); *B60W 30/181* (2013.01); *B60W 50/14* (2013.01); *G06T 7/73* (2017.01); *G06V 20/586* (2022.01); *B60R 2300/105* (2013.01); *B60R 2300/607* (2013.01); *B60R 2300/806* (2013.01); *B60W 2050/146* (2013.01); *G06T 2207/30264* (2013.01)

(58) Field of Classification Search
CPC .... B60W 30/06; B60W 30/181; B60W 50/14; B60W 2050/146; B60R 1/22; B60R 2300/105; B60R 2300/607; B60R 2300/806; G06T 7/73; G06T 2207/30264; G06V 20/586
See application file for complete search history.

(56) References Cited

U.S. PATENT DOCUMENTS

| | | | | |
|---|---|---|---|---|
| 9,697,733 | B1 * | 7/2017 | Penilla | G06Q 30/0645 |
| 10,429,850 | B2 * | 10/2019 | Kato | B60R 1/27 |
| 10,696,295 | B2 * | 6/2020 | Nakada | B60W 30/06 |

(Continued)

FOREIGN PATENT DOCUMENTS

JP 2011-025754 A 2/2011

*Primary Examiner* — John A Tweel, Jr.
(74) *Attorney, Agent, or Firm* — Sughrue Mion, PLLC

(57) ABSTRACT

A vehicle driving assist system includes a controller and a display. The controller is configured to generate a bird's-eye view image based on information on images around a vehicle, respectively captured by cameras, and acquire a target route from a current location of the vehicle to a target stop location set by a driver. The display is configured to display the bird's-eye view image and the target route and allow the driver to use the bird's-eye view image to set a no entry area. The controller is configured to, when the controller determines that the vehicle enters the no entry area if the vehicle moves along the target route, correct the target route such that the vehicle does not enter the no entry area and cause the vehicle to move to the target stop location along the corrected target route and stop at the target stop location.

6 Claims, 12 Drawing Sheets

(56) References Cited

U.S. PATENT DOCUMENTS

| | | | |
|---|---|---|---|
| 10,747,218 B2* | 8/2020 | Lavoie | B62D 1/00 |
| 11,032,479 B2* | 6/2021 | Sakuragi | B60R 1/28 |
| 11,479,238 B2* | 10/2022 | Tsujino | B60W 50/082 |
| 2007/0003108 A1* | 1/2007 | Chinomi | G01S 15/931 |
| | | | 382/104 |
| 2023/0158956 A1* | 5/2023 | Fujiwara | G06T 15/20 |
| | | | 345/419 |

* cited by examiner

VEHICLE DRIVING ASSIST SYSTEM

CROSS-REFERENCE TO RELATED APPLICATION

This application claims priority to Japanese Patent Application No. 2021-173339 filed on Oct. 22, 2021, incorporated herein by reference in its entirety.

BACKGROUND

1. Technical Field

The disclosure relates to a vehicle driving assist system suitable for assisting in parking a vehicle, such as automobile, and causing the vehicle to exit.

2. Description of Related Art

As a driving assist system for a vehicle, such as an automobile, there is known a driving assist system as described in, for example, Japanese Unexamined Patent Application Publication No. 2011-025754 (JP 2011-025754 A). The driving assist system generates a predetermined route to a predetermined target location and assists the vehicle such that the vehicle runs along the predetermined route. The driving assist system described in JP 2011-025754 A generates a plurality of routes, determines whether the vehicle is able to reach a target location in consideration of obstacles and the like, and, when the vehicle is not able to reach the target location, generates routes from a reachable location to the target location again.

SUMMARY

The driving assist system generates predetermined routes by extracting feature points based on information on an image around the vehicle, acquired by a camera, and determining a movable area of the vehicle based on the feature points.

However, in determining a movable area based on feature points, it is not possible to grasp an area where a driver intends to avoid entry of the vehicle (referred to as "no entry area"). For this reason, a predetermined route can be generated so as to pass through the no entry area. In this case, at the time of assisting the vehicle in running along the predetermined route, it is difficult for the vehicle to avoid passage of the no entry area.

The disclosure provides a vehicle driving assist system capable of preventing a vehicle from passing through a no entry area and assisting the vehicle in moving from a current location to a target stop location.

An aspect of the disclosure provides a vehicle driving assist system. The vehicle driving assist system includes multiple cameras (21) each configured to capture an image around a vehicle, a controller (a VC ECU 10 and a PVM-ECU 20) configured to generate a bird's-eye view image based on information on the images around the vehicle, respectively captured by the cameras and acquire a target route from a current location of the vehicle to a target stop location set by a driver. The display (22) is configured to display the bird's-eye view image and the target route. The controller is configured to, when the driver issues a command to move the vehicle to the target stop location, assist the vehicle in moving to the target stop location along the target route and stopping at the target stop location.

The display (22) may be configured to allow the driver to use the bird's-eye view image to set a no entry area where entry of the vehicle is prohibited, and the controller (VC ECU 10 and PVM-ECU 20) is configured to, when the controller determines that the vehicle enters the no entry area if the vehicle moves along the target route, correct the target route such that the vehicle does not enter the no entry area and assist the vehicle in moving to a target stop location along the corrected target route and stopping at the target stop location.

With the above configuration, when it is determined that the vehicle enters the no entry area if the vehicle moves along the target route, the target route is corrected such that the vehicle does not enter the no entry area, and the vehicle moves to the target stop location along the corrected target route and stops at the target stop location. Thus, it is possible to prevent the vehicle from passing through the no entry area and assist the vehicle in moving from the current location to the target stop location.

With the above configuration, the display is configured to allow the driver to use the bird's-eye view image to set a no entry area where entry of the vehicle is prohibited. Thus, the driver is able to use the bird's-eye view image to set a no entry area based on its own intention.

In the aspect of the disclosure, the display (22) may be configured to allow the driver to use the bird's-eye view image to set a temporary stop location where the vehicle is temporarily stopped, and the controller (the VC ECU 10 and the PVM-ECU 20) may be configured to, when the vehicle moves along the target route and the controller determines that the vehicle has reached the temporary stop location, stop the vehicle at the temporary stop location, and may be configured to check for safety based on at least the information on the images around the vehicle.

With the above configuration, when the vehicle moves along the target route and it is determined that the vehicle has reached the temporary stop location, the vehicle is caused to stop at the temporary stop location, and safety is checked based on at least the information on the images around the vehicle. Thus, it is possible to ensure safety at the time when the vehicle moves along the target route.

With the above configuration, the display is configured to allow the driver to use the bird's-eye view image to set the temporary stop location. Thus, the driver is able to use the bird's-eye view image to set a temporary stop location based on its own intention.

In the aspect of the disclosure, the controller may include a storage device configured to store at least one route along which the vehicle moves in accordance with driving of the driver, and the controller may be configured to acquire, of the at least one route stored in the storage device, a route corresponding to a route from the current location of the vehicle to the target stop location as the target route.

With the above configuration, at least one route along which the vehicle moves in accordance with driving of the driver is stored in the storage device, and, of the at least one route stored in the storage device, the route corresponding to the route from the current location of the vehicle to the target stop location is acquired as the target route. Thus, it is not necessary to extract feature points based on the information on the images around the vehicle, respectively captured by the cameras, to generate a target route from the current location of the vehicle to the target stop location based on the feature points, and the target route is able to be acquired.

In the aspect of the disclosure, the controller may be configured to extract feature points based on the information on the images around the vehicle, respectively captured by the cameras, and acquire a target route by generating the target route from the current location of the vehicle to the target stop location based on the feature points.

With the above configuration, feature points are extracted based on the information on the images around the vehicle, respectively captured by the cameras, and the target route from the current location of the vehicle to the target stop location is generated based on the feature points. Thus, it is not necessary to store a route along which the vehicle moves in accordance with driving of the driver, and the target route is able to be acquired.

In the aspect of the disclosure, the target stop location may be a target parking location, and the controller may be configured to assist the vehicle in moving from the current location to the target parking location along the target route and parking at the target parking location.

With the above configuration, the target stop location may be a target parking location, and the controller may be configured to assist the vehicle in moving from the current location to the target parking location along the target route and parking at the target parking location.

In the aspect of the disclosure, the current location of the vehicle may be a parking location, the target stop location may be a temporary stop location, and the controller may be configured to assist the vehicle in moving from the parking location to the temporary stop location along the target route and stopping at temporary stop location.

With the above configuration, the current location of the vehicle is a parking location, the target stop location is a temporary stop location, and the controller is configured to assist the vehicle in moving from the parking location to the temporary stop location along the target route and stopping at the temporary stop location.

In the above description, to help understand the aspects of the disclosure, reference signs in parentheses, used in an embodiment (described later), are assigned to the components of the disclosure, corresponding to the embodiment. However, the components of the disclosure are not limited to the components of the embodiment corresponding to the reference signs in parentheses. Other objects, other features, and associated benefits of the disclosure will be easily understood from the description of the embodiments of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration

Figure 1:
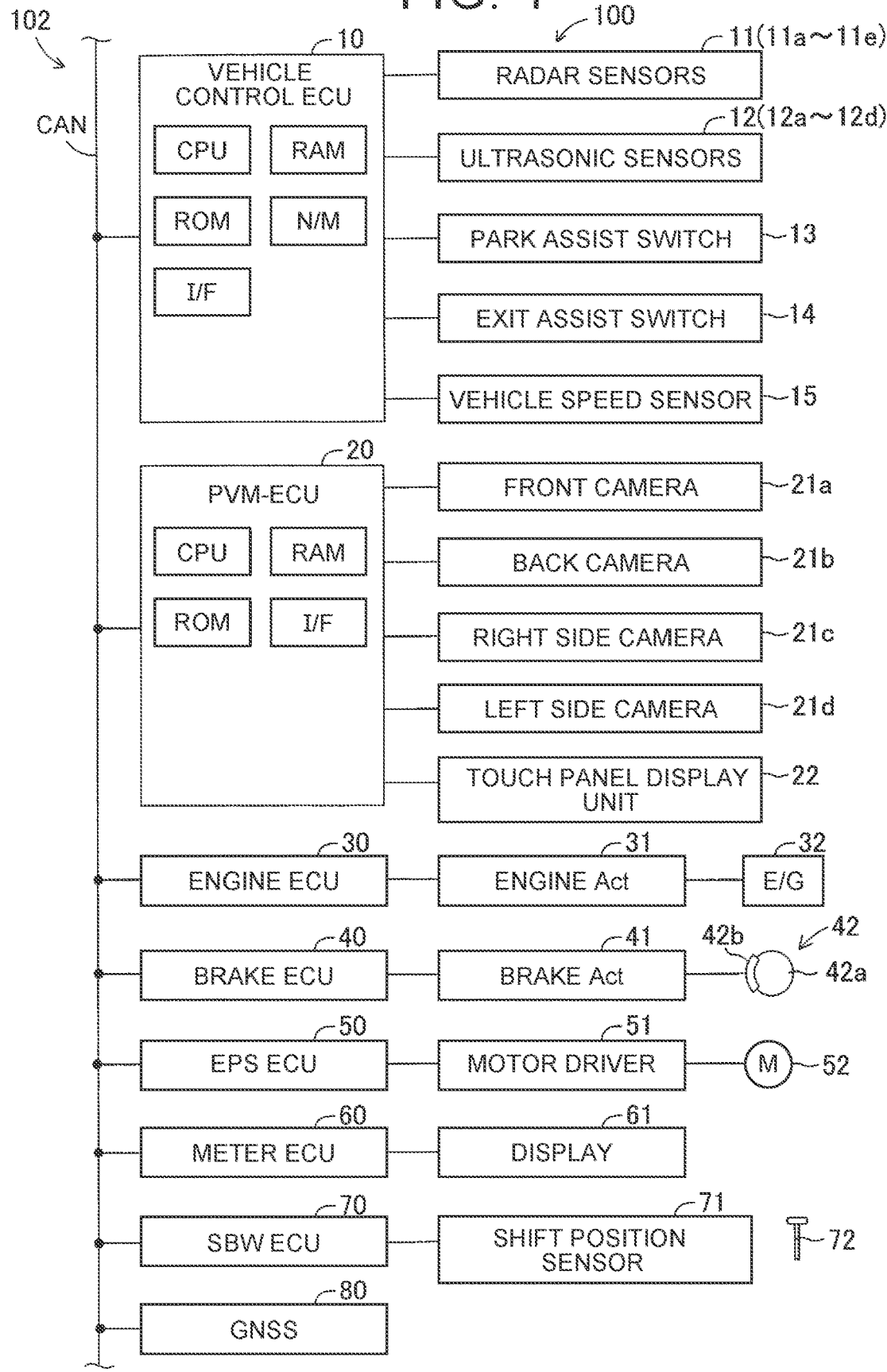
FIG. 1 is a schematic block diagram of a driving assist system according to an embodiment of the disclosure, configured as a park assist system.

As shown in FIG. 1, a driving assist system according to an embodiment of the disclosure is configured as a park assist system 100 applied to a vehicle 102. The park assist system 100 includes a vehicle control ECU 10, a panoramic view monitor (PVM)-ECU 20, an engine ECU 30, a brake ECU 40, an EPS ECU 50, a meter ECU 60, a shift-by-wire (SBW) ECU 70, and a GNSS 80. An ECU is an electronic control unit that includes a microcomputer as a main component. The vehicle control ECU 10 is also referred to as "vehicle control (VC) ECU".

The microcomputer of each ECU includes a CPU, a ROM, a RAM, a read-write nonvolatile memory (N/M), an interface (I/F), and the like. The CPU implements various functions by running instructions (programs and routines) stored in the ROM. These ECUs are connected to one another via a controller area network (CAN) such that data is exchangeable (communicable). Therefore, detected values and the like of sensors (including switches) connected to a specific ECU are also transmitted to other ECUs.

A plurality of radar sensors 11a, 11b, 11c, 11d, 11e, a plurality of ultrasonic sensors 12a, 12b, 12c, 12d, a park assist switch 13, an exit assist switch 14, and a vehicle speed sensor 15 are connected to the VC ECU 10. The radar sensors 11a, 11b, 11c, 11d, 11e are referred to as radar sensors 11 when not distinguished from one another. The ultrasonic sensors 12a, 12b, 12c, 12d are referred to as ultrasonic sensors 12 when not distinguished from one another.

The radar sensor 11 is a known sensor that uses millimeter-wave-band radio waves (hereinafter, referred to as millimeter waves). The radar sensor 11 acquires target information that determines a distance between the vehicle 102 and a three-dimensional object, a relative velocity between the vehicle 102 and the three-dimensional object, a relative position (direction) of the three-dimensional object with respect to the vehicle 102, and the like and outputs the target information to the VC ECU 10.

Although not shown in the drawing, the radar sensors 11a, 11g, 11c, 11d, 11e are respectively disposed at the front right corner, front center, front left corner, rear right corner, and rear left corner of the vehicle 102. Each of the radar sensors 11a, 11b, 11c acquires target information of a three-dimensional object present in an associated one of a right front area, a front area, and a left front area with respect to the vehicle 102. Each of the radar sensors 11d, 11e acquires target information of a three-dimensional object present in an associated one of a right rear area and a left rear area with respect to the vehicle 102.

The ultrasonic sensor 12 is a known sensor that uses ultrasonic waves. The ultrasonic sensor 12 transmits ultrasonic waves to a predetermined range, receives reflected waves reflected from a three-dimensional object, and detects the presence or absence of a three-dimensional object and a distance to the three-dimensional object based on a time from transmission of ultrasonic waves to reception of the ultrasonic waves.

Each of the ultrasonic sensors 12a, 12b, 12c, 12d acquires a distance between a first ultrasonic sensor and a three-dimensional object present in the following detection area and transmits information on the distance to the VC ECU 10. A detection area of the ultrasonic sensor 12a is a right front area with respect to the vehicle 102. A detection area of the ultrasonic sensor 12b is a left front area with respect to the vehicle 102. A detection area of the ultrasonic sensor 12c is a right rear area with respect to the vehicle 102. A detection area of the ultrasonic sensor 12d is a left rear area with respect to the vehicle 102.

As will be described in detail later, the park assist switch 13 is a switch to be operated by a driver when park assist control is executed, and the exit assist switch 14 is a switch to be operated by the driver when exit assist control is executed. The vehicle speed sensor 15 detects the speed of the vehicle 102 by detecting wheel speeds, and outputs a signal indicating the vehicle speed.

A front camera 21a, a back camera 21b, a right side camera 21c, and a left side camera 21d that are image capture devices are connected to the PVM-ECU 20. The front camera 21a, the back camera 21b, the right side camera 21c, and the left side camera 21d are referred to as cameras 21 when not distinguished from one another.

Although not shown in details in the drawing, the front camera 21a is provided at substantially the center of a front bumper in a vehicle width direction and captures an image in front of the vehicle 102. The back camera 21b is provided at the wall of a rear boot at the rear of the vehicle 102 and captures an image behind the vehicle 102. The right side camera 21c is provided at a right door mirror and captures a right side area to the vehicle 102. The left side camera 21d is provided at a left door mirror and captures a left side area to the vehicle 102.

Each of the cameras 21 has a wide angle of view. Therefore, an image capturing range of each camera 21 includes a right range, a left range, a lower range, and an upper range with respect to an optical axis that is, a center. The four cameras 21 capture all around the vehicle 102 in cooperation with one another. The camera 21 acquires image information (image data) by capturing an image in an area around the vehicle 102, associated with the image capturing range, each time a predetermined time elapses. The camera 21 transmits the acquired image data to the PVM-ECU 20 and the VC ECU 10.

The PVM-ECU 20 generates surrounding image data each time a predetermined time elapses by using front image data transmitted from the front camera 21a, rear image data transmitted from the back camera 21b, right-hand side image data transmitted from the right side camera 21c, and left-hand side image data transmitted from the left side camera 21d. An image displayed (generated) based on surrounding image data is referred to as surrounding image. A surrounding image is an image that corresponds to the range of at least part of an area around the vehicle 102, and includes a camera-view image, a composite image, and the like.

A camera-view image is an image with a viewpoint set at the location of the lens of each camera 21. One composite image is an image when the surroundings of the vehicle 102 are viewed from an imaginary viewpoint set at a selected location around the vehicle 102 (also referred to as "imaginary viewpoint image").

The PVM-ECU 20 is capable of generating an image obtained by synthesizing (superposing) a vehicle image (for example, a polygon representing the shape of a vehicle), lines supporting parking operation, and the like with (over) a camera-view image and a virtual viewpoint image. Such an image is also referred to as a surrounding image.

The PVM-ECU 20 generates front bird's-eye view image data, rear bird's-eye view image data, right-hand bird's-eye view image data, left-hand bird's-eye view image data, and an all-around bird's-eye view image data by using front image data, rear image data, right-hand side image data, and left-hand side image data, respectively, each time a predetermined time elapses. Images respectively generated based on front bird's-eye view image data, rear bird's-eye view image data, right-hand bird's-eye view image data, left-hand bird's-eye view image data, and all-around bird's-eye view image data are referred to as a front bird's-eye view image, a rear bird's-eye view image, a right-hand bird's-eye view image, a left-hand bird's-eye view image, and an all-around bird's-eye view image, respectively. The front bird's-eye view image, the rear bird's-eye view image, the right-hand bird's-eye view image, the left-hand bird's-eye view image, and the all-around bird's-eye view image are referred to as bird's-eye view images where necessary.

The VC ECU 10 is configured to be able to acquire bird's-eye view images from the PVM-ECU 20 each time a predetermined time elapses and extract feature points by performing image analysis on the bird's-eye view images at predetermined timing. As is known, in extracting feature points, the VC ECU 10 divides each of the image capturing ranges of the bird's-eye view images into a plurality of divided areas, and extracts feature points in preset number for each divided area. Each of the feature points is a square-shape image including a part of which a change in luminance is relatively large (particularly, a corner and a curved part). For example, a boundary between concrete and lawn (particularly, a corner), a boundary between concreate brick and concrete brick (particularly a corner) for closing side grooves, and the like are extracted as feature points.

A touch panel display unit 22 is further connected to the PVM-ECU 20. The touch panel display unit 22 is a touch panel display of a navigation system (not shown). The PVM-ECU 20 displays a surrounding image on the touch panel display unit 22 in response to a command transmitted from the VC ECU 10.

In the present embodiment, the VC ECU 10 is configured to be able to execute park assist control and exit assist control. Although described in detail later, the park assist control includes two assist modes, that is, control in a park registration mode and control in a park assist mode, and the exit assist control includes two assist modes, that is, control in an exit registration mode and control in an exit assist mode. When the VC ECU 10 executes park assist control, the PVM-ECU 20 displays an operation image including a surrounding image on the touch panel display unit 22 in response to a command transmitted from the VC ECU 10.

The engine ECU 30 is connected to an engine actuator 31. The engine actuator 31 includes a throttle valve actuator that changes the opening degree of a throttle valve of the engine 32. The engine ECU 30 changes the torque generated by the engine 32 by driving the engine actuator 31. Although not shown in the drawing, the torque generated by the engine 32 is transmitted to drive wheels via a transmission.

Therefore, the engine ECU 30 is able to control the driving force of the vehicle 102 by controlling the engine actuator 31. The VC ECU 10 is able to transmit a driving command to the engine ECU 30. When the engine ECU 30 receives a driving command, the engine ECU 30 controls the engine actuator 31 in response to the driving command. Therefore, the VC ECU 10 is able to execute automatic driving force control via the engine ECU 30.

When the vehicle 102 is a hybrid electric vehicle, the engine ECU 30 is able to control the driving force of the vehicle 102, generated by any one or both of the engine and an electric motor, as vehicle driving sources. When the vehicle 102 is a battery electric vehicle, the engine ECU 30 is able to control the driving force of the vehicle 102, generated by the electric motor, as a vehicle driving source.

The brake ECU 40 is connected to a brake actuator 41. The brake actuator 41 is provided in a hydraulic circuit between a master cylinder (not shown) that pressurizes hydraulic fluid by depression force applied to a brake pedal and a friction brake mechanism 42 provided in each of right and left, front and rear wheels. The friction brake mechanism 42 includes a brake disc 42a fixed to the wheel, and a brake caliper 42b fixed to a vehicle body.

The brake actuator 41 regulates a hydraulic pressure to be supplied to a wheel cylinder in the brake caliper 42b in response to an instruction from the brake ECU 40, and presses a brake pad against the brake disc 42a by actuating the brake caliper 42b through the hydraulic pressure to generate friction braking force.

Therefore, the brake ECU 40 is able to control the braking force of the vehicle 102 by controlling the brake actuator 41. The VC ECU 10 is able to transmit a braking command to the brake ECU 40. When the brake ECU 40 receives the braking command, the brake ECU 40 controls the brake actuator 41 in response to the braking command. Therefore, the VC ECU 10 is able to execute automatic braking force control via the brake ECU 40.

The EPS ECU 50 is a known controller for an electric power steering system and is connected to a motor driver 51. The motor driver 51 is connected to a turning motor 52 incorporated in a steering mechanism. The turning motor 52 is able to generate torque by using electric power supplied from the motor driver 51 and generate steering assist torque or turn the right and left steered wheels by the torque. In other words, the turning motor 52 is able to change the turning angle (also referred to as "steering angle") of the steered wheels of the vehicle 102.

Although not shown in FIG. 1, the EPS ECU 50 is connected to a steering angle sensor and a steering torque sensor. The EPS ECU 50 applies steering assist torque to the steering mechanism by driving the turning motor 52 based on a steering torque detected by a steering torque sensor, thus assisting the driver in steering operation.

The VC ECU 10 transmits a steering command to the EPS ECU 50 as needed. When the EPS ECU 50 receives a steering command, the EPS ECU 50 drives the turning motor 52 based on the received steering command. Therefore, the VC ECU 10 is able to automatically change the steering angle of the steered wheels of the vehicle 102 via the EPS ECU 50 without the need of steering operation of the driver. In other words, the VC ECU 10 is able to execute automatic steering angle control via the EPS ECU 30.

The meter ECU 60 is connected to a display 61. The display 61 is a multi-information display provided in front of a driver seat. The display 61 displays various pieces of information in addition to displaying measured values such as vehicle speed and engine rotation speed.

The SBW ECU 70 is connected to a shift position sensor 71. The shift position sensor 71 detects the position of a shift lever 72 as a movable portion of a shift operating unit. In the present embodiment, the positions of the shift lever 72 include parking position (P), forward position (D), and reverse position (R). The SBW ECU 70 receives the position of the shift lever 72 from the shift position sensor 71, and controls a transmission and/or driving direction switching mechanism (not shown) of the vehicle 102 based on the position (that is, executes shift control over the vehicle 102).

The VC ECU 10 transmits a shift command to the SBW ECU 70 as needed. When the SBW ECU 70 receives a shift command, the SBW ECU 70 is able to control the transmission and/or the driving direction switching mechanism and switch the position of the shift lever 72 in response to the shift command and not based on the operation of the shift lever 72 of the driver. Control of the transmission and/or the driving direction switching mechanism based on a shift command transmitted from the VC ECU 10 is referred to as automatic shift position control.

The GNSS 80 receives radio waves emitted from positioning satellites and sequentially measures the current location (specifically, latitude and longitude) of the vehicle 102 based on the received radio waves. The GNSS 80 sequentially transmits the measured current location of the vehicle 102 to the VC ECU 10. The GNSS 80 may be replaced with a GPS.

As described above, the park assist control includes two assist modes, that is, control in a park registration mode and control in a park assist mode, and the exit assist control includes two assist modes, that is, control in an exit registration mode and control in an exit assist mode. As shown in the following Table 1, each of the modes of park assist control and exit assist control includes sub-modes. As will be described later, a mode is selected by operating the park assist switch 13 or the exit assist switch 14, and a sub-mode is selected by using images displayed on the touch panel display unit 22.

TABLE 1

Figure 2:
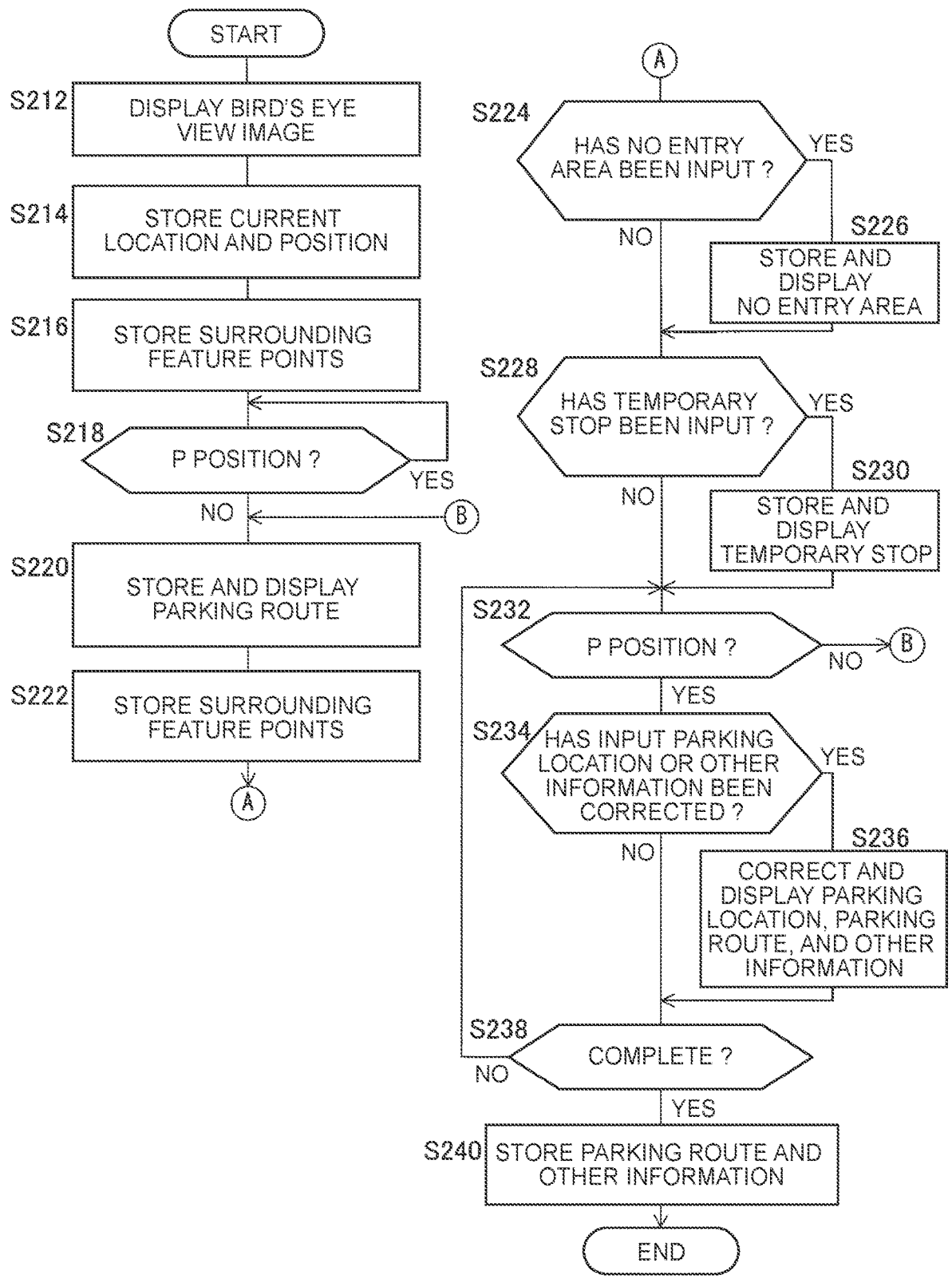
FIG. 2 is a flowchart showing a control routine of a parking route storing sub-mode according to the embodiment.
Figure 3:
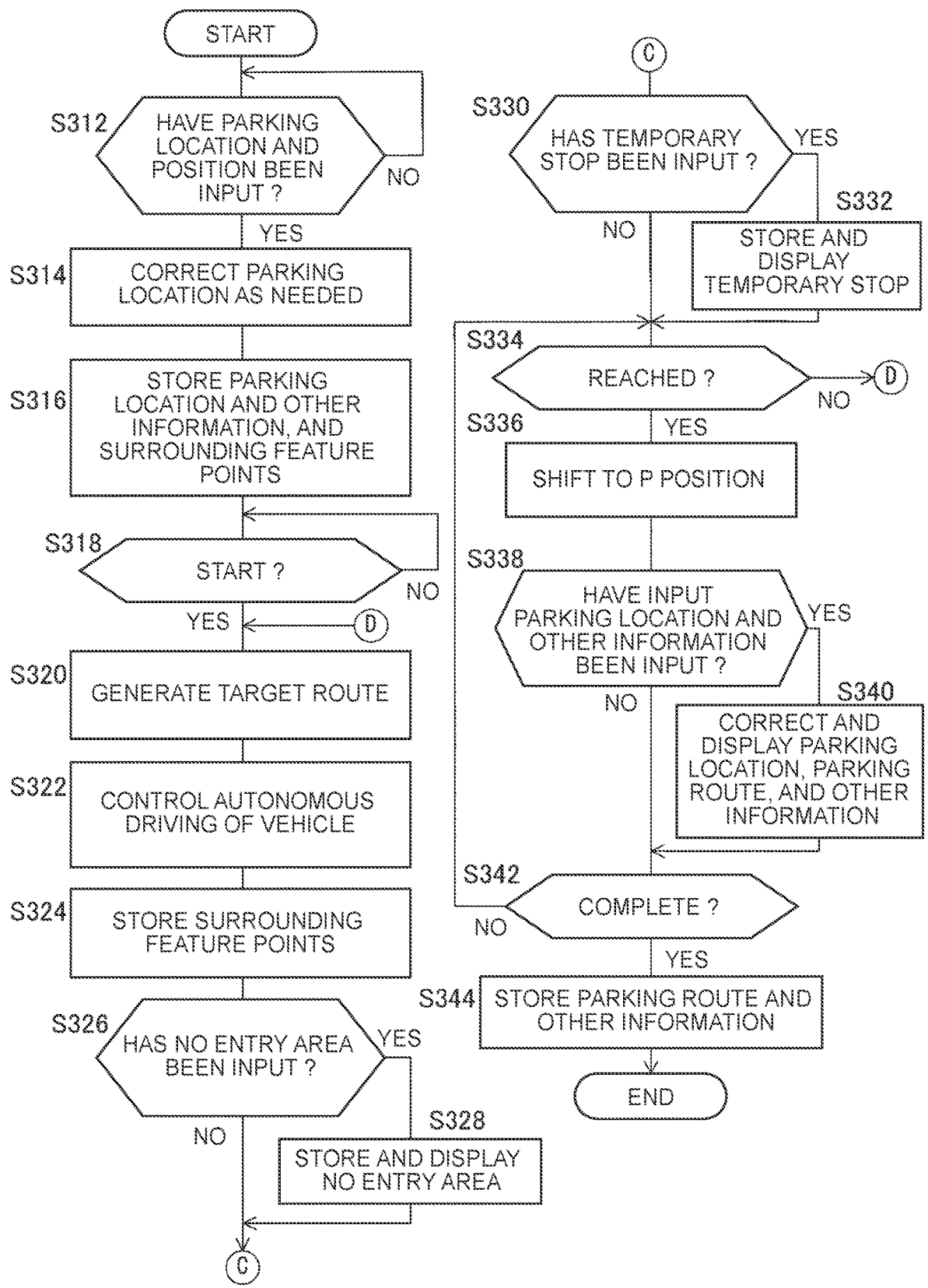
FIG. 3 is a flowchart showing a control routine of a target route setting sub-mode according to the embodiment.
Figure 4:
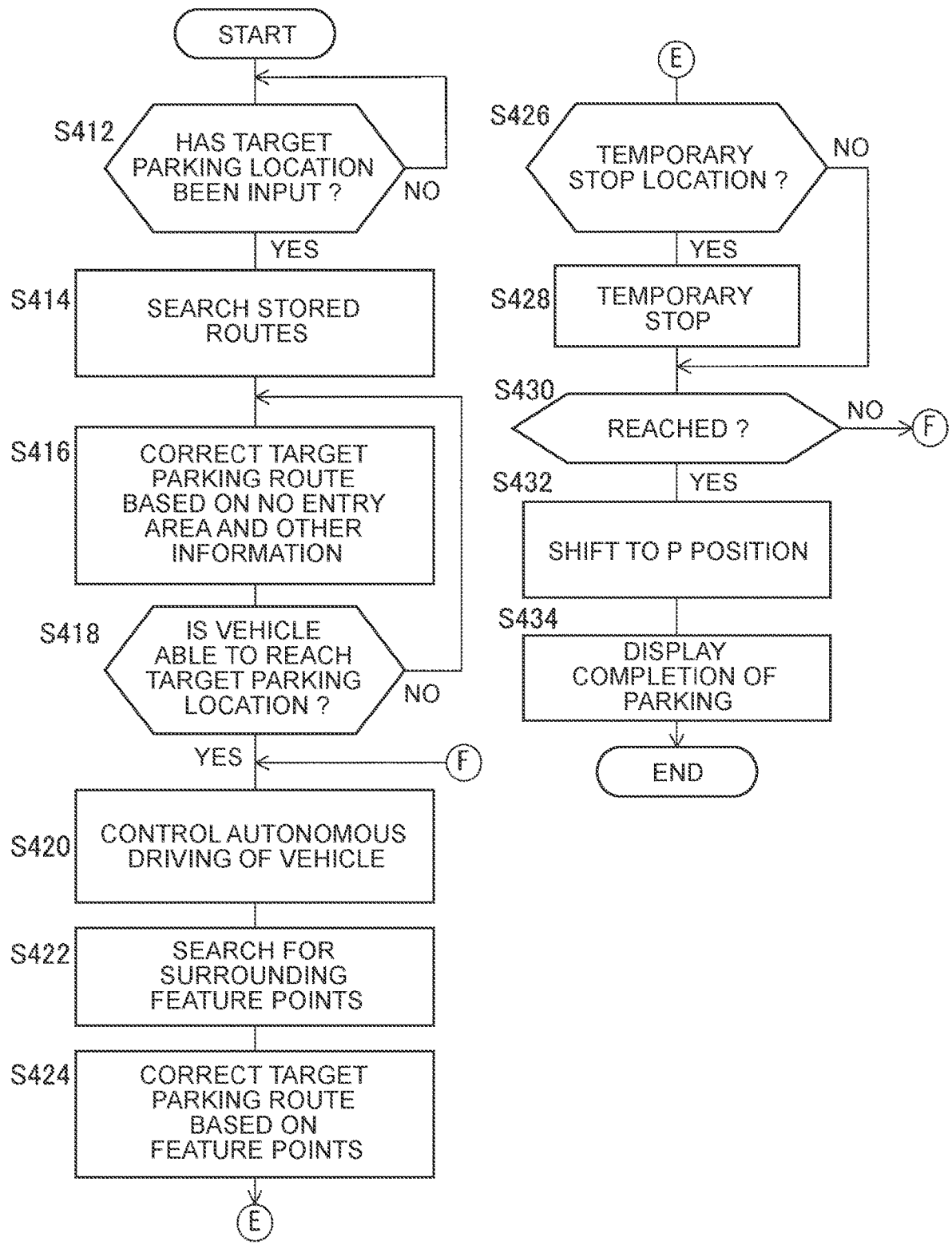
FIG. 4 is a flowchart showing a control routine of a stored route usage sub-mode according to the embodiment.
Figure 5:
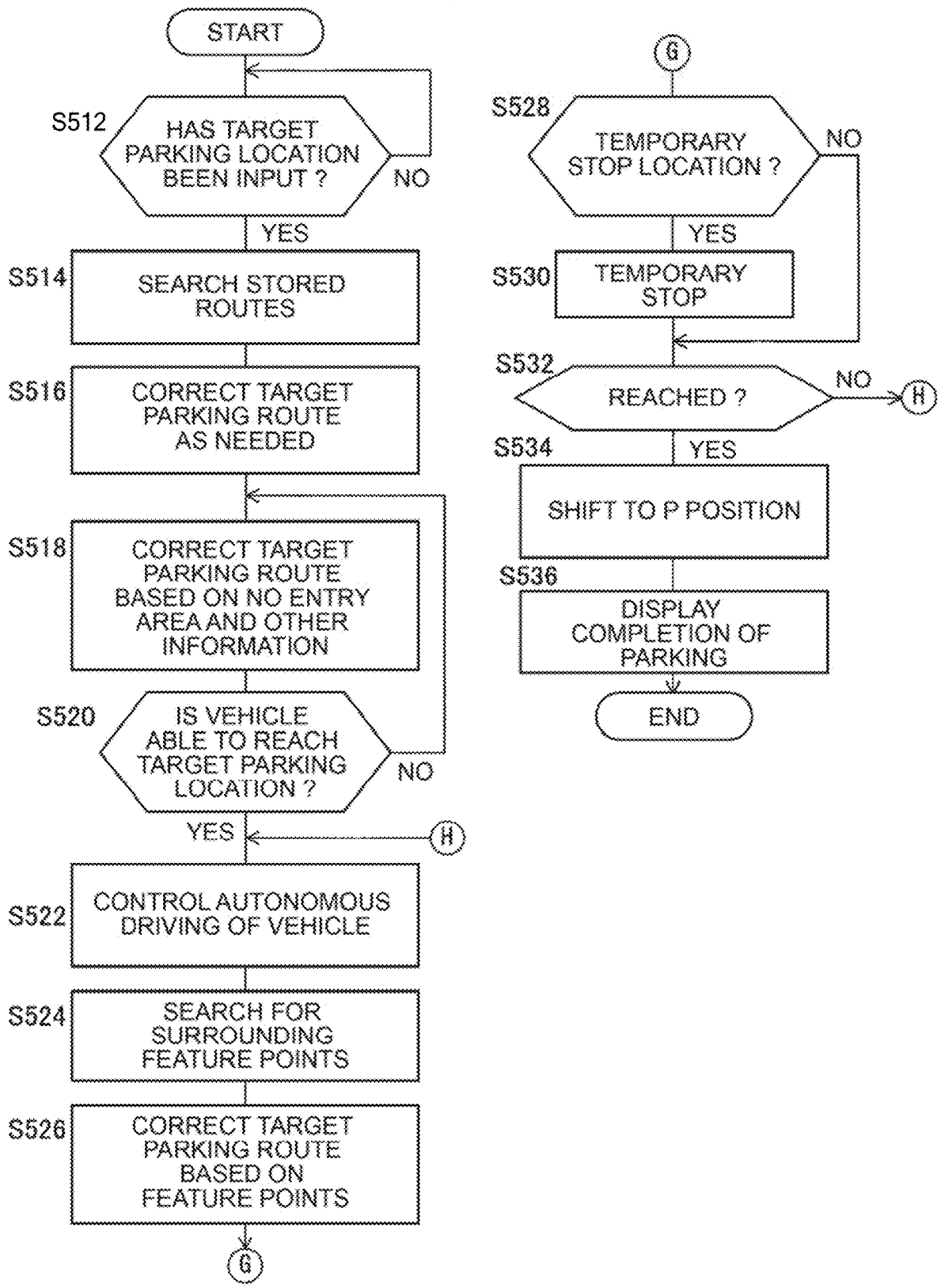
FIG. 5 is a flowchart showing a control routine of a target route usage sub-mode according to the embodiment.
Figure 6:
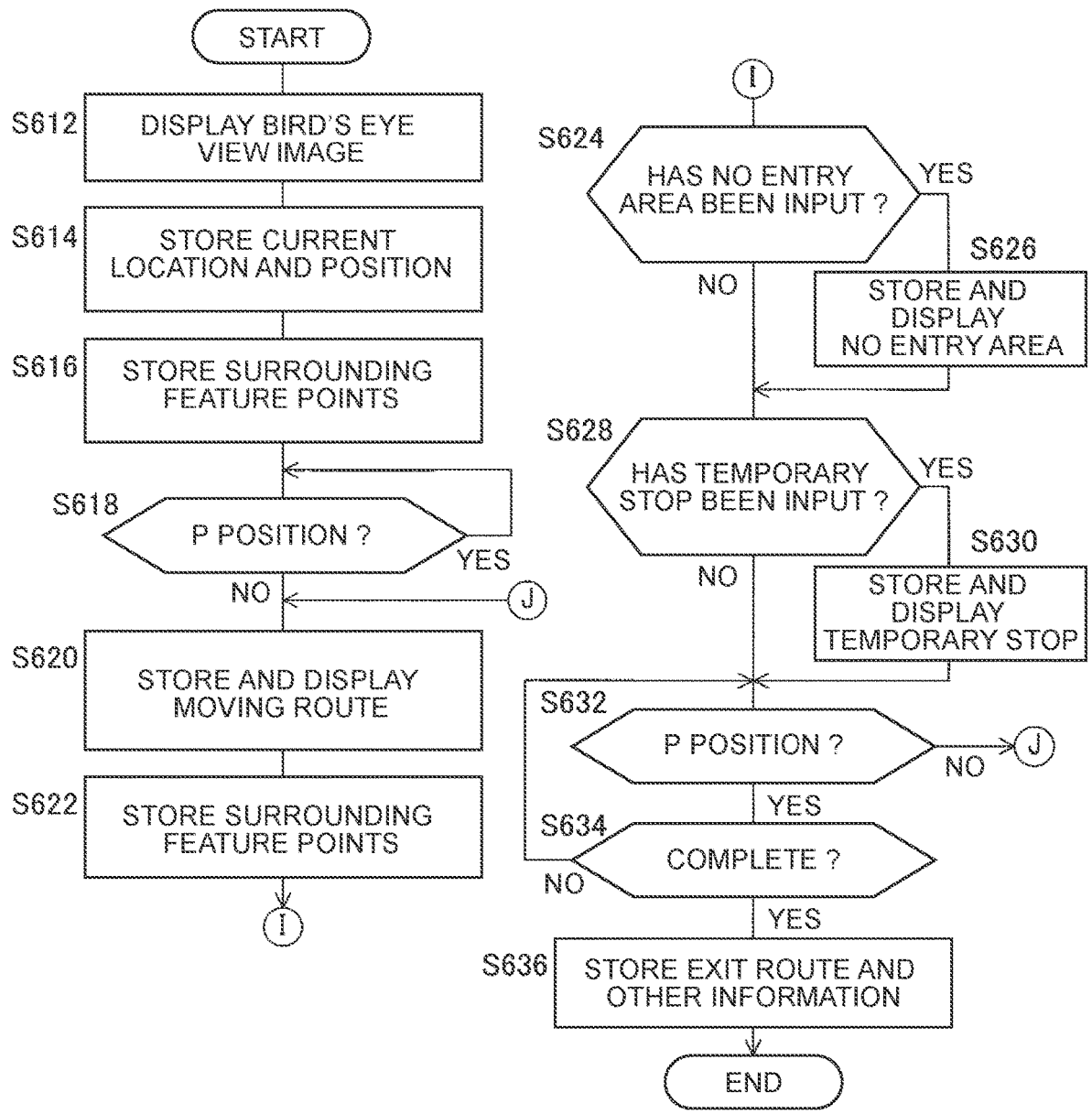
FIG. 6 is a flowchart showing a control routine of an exit route storing sub-mode according to the embodiment.
Figure 7:
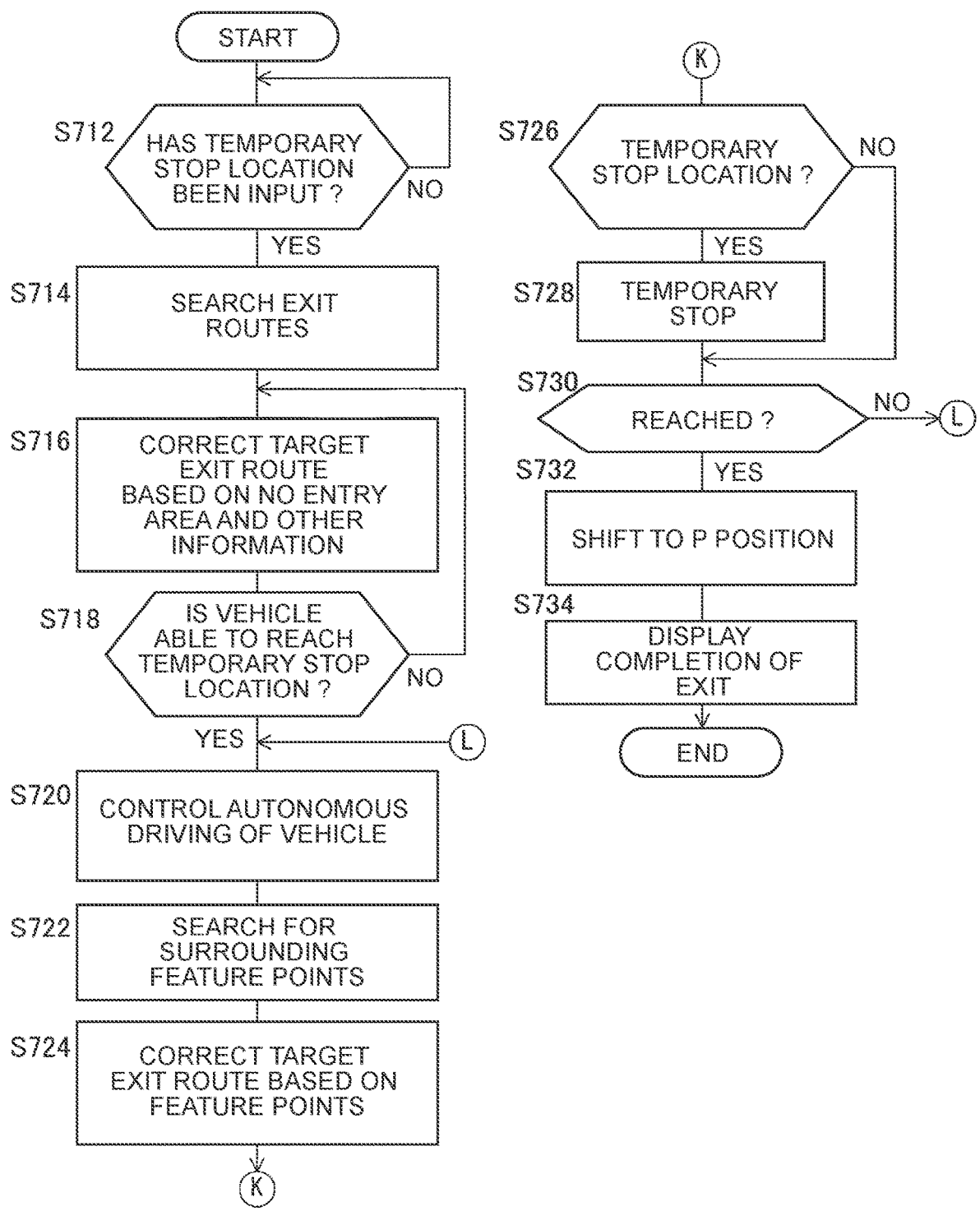
FIG. 7 is a flowchart showing a control routine of an exit route usage sub-mode according to the embodiment.
Figure 8:
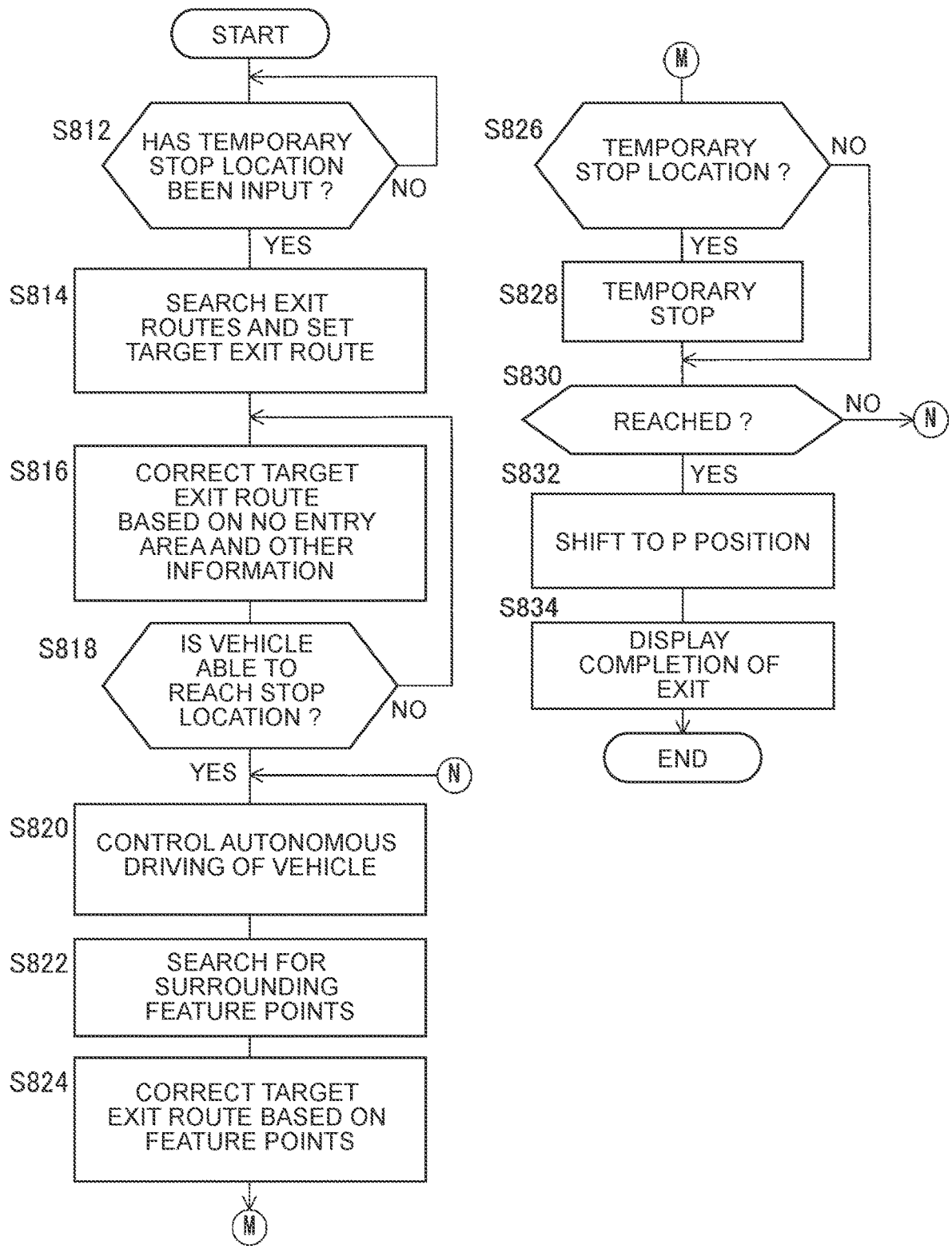
FIG. 8 is a flowchart showing a control routine of a parking route usage sub-mode according to the embodiment.

| MODE | SUB-MODE | FIG. |
| --- | --- | --- |
| PARK REGISTRATION | PARKING ROUTE STORING | FIG. 2 |
|  | TARGET ROUTE SETTING | FIG. 3 |
| PARK ASSIST | STORED ROUTE USAGE | FIG. 4 |
|  | TARGET ROUTE USAGE | FIG. 5 |
| EXIT REGISTRATION | EXIT ROUTE STORING | FIG. 6 |
| EXIT ASSIST | EXIT ROUTE USAGE | FIG. 7 |
|  | PARTING ROUTE USAGE | FIG. 8 |

Park Registration Mode

The park registration mode is a mode to register a target parking location and a route from the current location of the vehicle 102 to the target parking location and includes a parking route storing sub-mode and a target route setting sub-mode. Registration is performed when a registration object is stored in the nonvolatile memory of the VC ECU 10. In any of the sub-modes, information on feature points around the vehicle 102, which changes with movement of the vehicle 102, is associated with information on the location of the vehicle 102 and stored in the nonvolatile memory of the VC ECU 10.

In the parking route storing sub-mode, as will be described later with reference to FIG. 2, the driver drives the vehicle 102 from a registration start location to a target parking location, and the registration start location, a moving route of the vehicle 102 from the registration start location to the target parking location, and the target parking location are registered.

In the target route setting sub-mode, as will be described later with reference to FIG. 3, the driver stops the vehicle 102 at the registration start location, and the driver uses an image displayed on the touch panel display unit 22 to set the target parking location. A target parking route from the registration start location to the target parking location is set by the VC ECU 10 in accordance with a known procedure in the technical field, and the registration start location, the target parking location, and the target parking route are registered.

Figure 9:
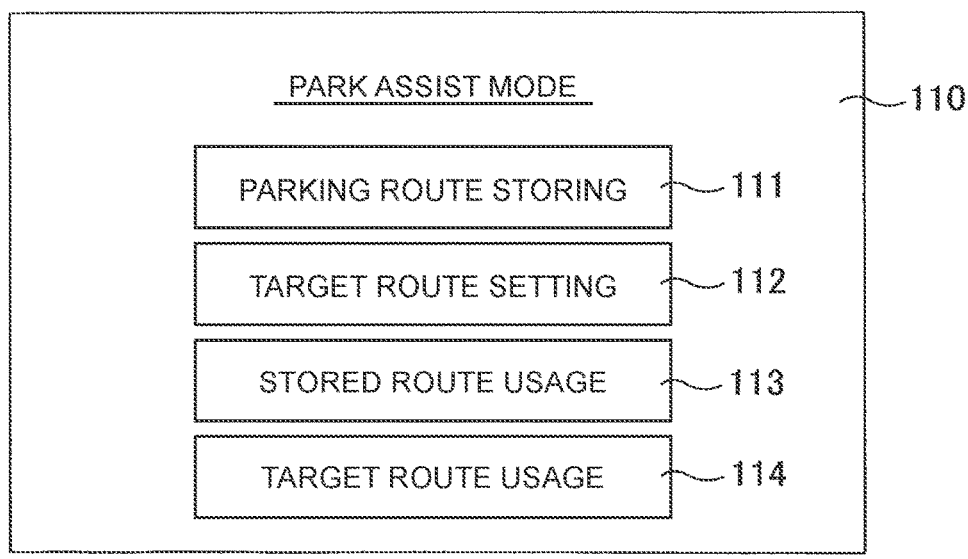
FIG. 9 is a view showing sub-mode icons of a park assist mode.

When the park assist switch 13 is turned on, a parking route storing icon 111, a target route setting icon 112, a stored route usage icon 113, and a target route usage icon 114 are displayed on a screen 110 of the touch panel display unit 22, as shown in FIG. 9. When the driver selects any one of the icons by touching, control in an associated one of the sub-modes is started.

Figure 10:
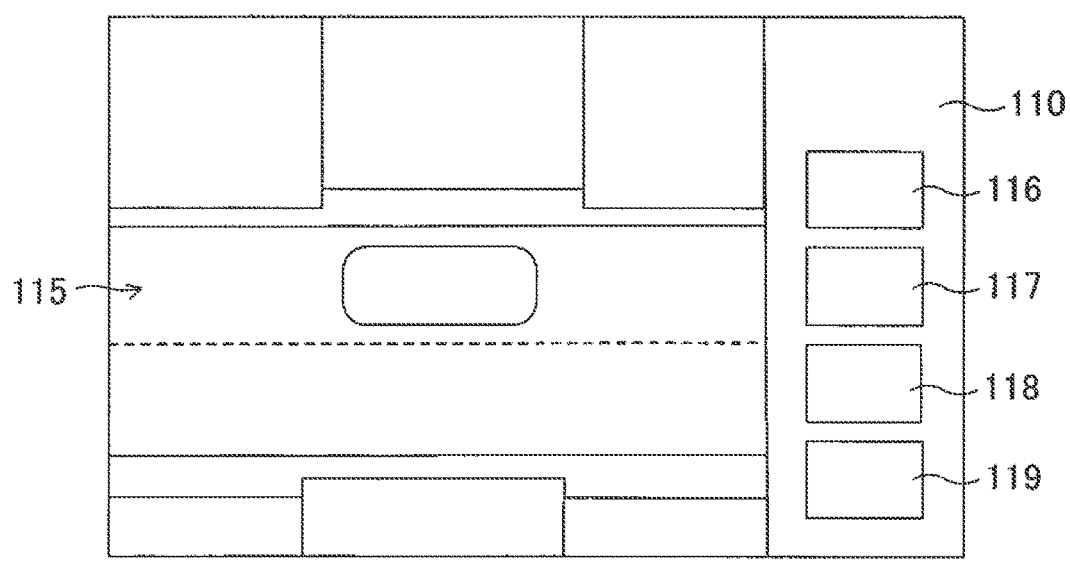
FIG. 10 is a view showing a screen for an exit assist mode.

Particularly, when control in the parking route storing sub-mode and control in the target route setting sub-mode are being executed, a bird's-eye view image 115 is displayed on the screen 110 of the touch panel display unit 22, and a no entry area setting icon 116, a no entry area clear icon 117, a temporary stop setting icon 118, and a temporary stop clear icon 119 are displayed, as shown in FIG. 10.

When the driver selects the no entry area setting icon 116 by touching, the driver is able to set a no entry area to an area on the bird's-eye view image 115 by touching and tracing the area. The set no entry area is displayed on the bird's-eye view image 115 by, for example, red continuous line. When the driver touches the no entry area clear icon 117 and selects the already set no entry area, the no entry area is cleared.

When the driver selects the temporary stop setting icon 118 by touching, the driver is able to set a temporary stop location at a point on the bird's-eye view image 115 by touching and tracing the point. The set temporary stop location is displayed on the bird's-eye view image 115 by, for example, blue dashed line. When the driver touches the temporary stop clear icon 119 and selects the already set temporary stop location, the temporary stop location is cleared.

Park Assist Mode

The park assist mode is a mode to automatically move the vehicle 102 from the current location to the target parking location and includes a stored route usage sub-mode and a set route usage sub-mode. When the vehicle 102 is automatically moved, the automatic driving force control, automatic braking force control, and automatic steering angle control are executed as needed.

In the stored route usage sub-mode, as will be described later with reference to FIG. 4, the driver uses the bird's-eye view image 115 displayed on the screen 110 of the touch panel display unit 22 to determine a target parking location. Subsequently, of parking routes stored in the nonvolatile memory (referred to as "stored routes"), the stored route of which the target start location is the current location of the vehicle 102 and the target parking location is the target parking location determined by the driver is read. The vehicle 102 is then automatically moved to the target parking location along the target route (when the registered target route is corrected, the corrected target route).

As a result of comparison between the detected feature points and the feature points stored in the nonvolatile memory based on information on the current location of the vehicle 102, a deviation between the current location of the vehicle 102 and the stored registration start location and a deviation in the direction of the vehicle 102 are determined. In addition, the stored routes are corrected as needed based on the deviation in location and the deviation in direction.

When there is no stored route of which the target start location is the current location of the vehicle 102 and the target parking location determined by the driver is the target parking location, the screen 110 of the touch panel display unit 22 displays that it is not possible to perform park assist in the stored route usage sub-mode.

Control in the target route usage sub-mode is executed subsequently to control in the parking route setting sub-mode. Thus, when the parking route setting sub-mode is complete, for example, "CONTINUE PARKING?" icon may be displayed on the screen 110 of the touch panel display unit 22, and control in the target route usage sub-mode may be executed when the driver touches the icon.

In the target route usage sub-mode, as will be described later with reference to FIG. 5, the vehicle 102 is automatically moved from the current location to the target parking location along the target route set by control in the parking route setting sub-mode.

Exit Registration Mode

The exit registration mode is a mode to register a temporary stop location and a route from the parking location of the vehicle 102 to the temporary stop location and includes only an exit route storing sub-mode. In this sub-mode as well, information on feature points around the vehicle 102, which changes with movement of the vehicle 102, is associated with information on the location of the vehicle 102 and stored in the nonvolatile memory of the VC ECU 10.

In the exit route storing sub-mode, as will be described later with reference to FIG. 6, the driver drives the vehicle 102 from the parking location to the temporary stop location, and the parking location at that time, an exit route from the parking location to the temporary stop location, and the temporary stop location are registered.

When control in the exit route storing sub-mode is being executed, the bird's-eye view image 115 is displayed on the screen 110 of the touch panel display unit 22, and the no entry area setting icon 116 and the temporary stop setting icon 118 are displayed, as in the case of control in the parking route storing sub-mode and control in the target route setting sub-mode. When the driver selects the no entry area setting icon 116 by touching, the driver is able to set a no entry area by touching on the bird's-eye view image 115. The set no entry area is displayed in the bird's-eye view image 115 by, for example, red line. Similarly, when the driver selects the temporary stop setting icon 118 by touching, the driver is able to set a temporary stop by touching on the bird's-eye view image 115. The set temporary stop is displayed on the bird's-eye view image 115 by, for example, blue dashed line.

Exit Assist Mode

The exit assist mode is a mode to automatically move the vehicle 102 from a parking location to a temporary stop location and includes an exit route usage sub-mode and a parking route usage sub-mode. When the vehicle 102 is automatically moved, the automatic driving force control, automatic braking force control, and automatic steering angle control are executed as needed.

In the exit route usage sub-mode, as will be described later with reference to FIG. 7, the exit route and the temporary stop location, registered in the exit route storing sub-mode, are read from the nonvolatile memory, and are displayed in the bird's-eye view image 115 on the screen 110 of the touch panel display unit 22. The vehicle 102 is then automatically moved to the temporary stop location along the exit route.

In the parking route usage sub-mode, as will be described later with reference to FIG. 8, the target parking route and the registration start location, registered in the travel route storing sub-mode, are read from the nonvolatile memory, and are displayed in the bird's-eye view image 115 on the screen 110. The stored registration start location is set for a temporary stop location, and the vehicle 102 is automatically moved to the temporary stop location along the target parking route in an opposite direction.

Control in Parking Route Storing Sub-Mode

Next, the control routine of the parking route storing sub-mode according to the embodiment will be described with reference to the flowchart shown in FIG. 2. Control according to the flowchart shown in FIG. 2 is started when the parking route storing icon 111 displayed on the touch panel display unit 22 is selected while the park assist switch 13 is on. In the following description, the CPU is the CPU of the VC ECU 10, and the nonvolatile memory is the nonvolatile memory of the VC ECU 10.

Initially, in step S212, the CPU acquires a bird's-eye view image from the PVM-ECU 20, and displays the bird's-eye view image on the touch panel display unit 22.

In step S214, the CPU stores the current location and direction of the vehicle 102, detected by the GNSS 80, in the nonvolatile memory.

In step S216, the CPU extracts feature points around the vehicle 102 by performing image analysis of the bird's-eye view image and stores information on the feature points in the nonvolatile memory in association with information on the current location and direction of the vehicle 102.

In step S218, the CPU determines whether the position of the shift lever 72, detected by the shift position sensor 71, is P position, that is, the vehicle 102 is stopped, based on information from the SBW ECU 70. When the CPU makes affirmative determination, the CPU repeatedly executes step S218: whereas, when the CPU makes negative determination, that is, when the CPU determines that the vehicle 102 is likely to be moving, the CPU proceeds with control in this sub-mode to step S220.

In step S220, the CPU acquires information on a moving route along which the driver drives the vehicle 102 toward a parking location based on a change in the current location of the vehicle 102, detected by the GNSS 80, and stores the moving route in the nonvolatile memory as a parking route. The CPU also displays the parking route in the bird's-eye view image displayed on the touch panel display unit 22.

In step S222, the CPU extracts feature points around the vehicle 102 by performing image analysis of the bird's-eye view image and stores information on the feature points in the nonvolatile memory in association with information on the current location and direction of the vehicle 102.

In step S224, the CPU determines whether the driver has input a no entry area by using the bird's-eye view image. When the CPU makes affirmative determination, the CPU stores information on the no entry area in the nonvolatile memory and displays the no entry area in the bird's-eye view image in step S226. In contrast, when the CPU makes negative determination, the CPU proceeds with control in this sub-mode to step S228.

In step S228, the CPU determines whether the driver has input a temporary stop by using the bird's-eye view image. When the CPU makes affirmative determination, the CPU stores information on the temporary stop in the nonvolatile memory and displays the temporary stop in the bird's-eye view image in step S230. In contrast, when the CPU makes negative determination, the CPU proceeds with control in this sub-mode to step S232.

In step S232, the CPU determines whether the position of the shift lever 72 is P position, that is, whether the vehicle 102 is stopped, as in the case of step S218. When the CPU makes negative determination, the CPU returns control in this sub-mode to step S220; whereas, when the CPU makes affirmative determination, that is, when the CPU determines that the vehicle 102 is stopped, the CPU proceeds with control in this sub-mode to step S234.

In step S234, the CPU determines whether the driver has input a corrected parking location or the like by using the bird's-eye view image. When the CPU makes negative determination, the CPU proceeds with control in this sub-mode to step S238. In contrast, when the CPU makes affirmative determination, the CPU corrects the parking location and the stored parking route in step S236, and displays the corrected parking location and the corrected parking route in the bird's-eye view image.

In this case, although not shown in the drawing, cross arrow icons for correcting location, that is, four up, down, right, and left-arrow icons, may be displayed in an all-around bird's-eye view image in which the image of the vehicle 102 is displayed, and a corrected parking location may be input by operating the icons. After the driver designates a parking route in the bird's-eye view image 115, the driver may correct the parking route by touching and tracing on the bird's-eye view image along an intended route.

In step S238, the CPU determines whether the driver has turned off the park assist switch 13. When the CPU makes negative determination, the CPU returns control in this sub-mode to step S232. In contrast, when the CPU makes affirmative determination, the CPU stores the parking start location, the parking location, and the parking route (when a correction has been performed, the corrected parking location and the corrected parking route) in the nonvolatile memory in step S240.

Figure 11:
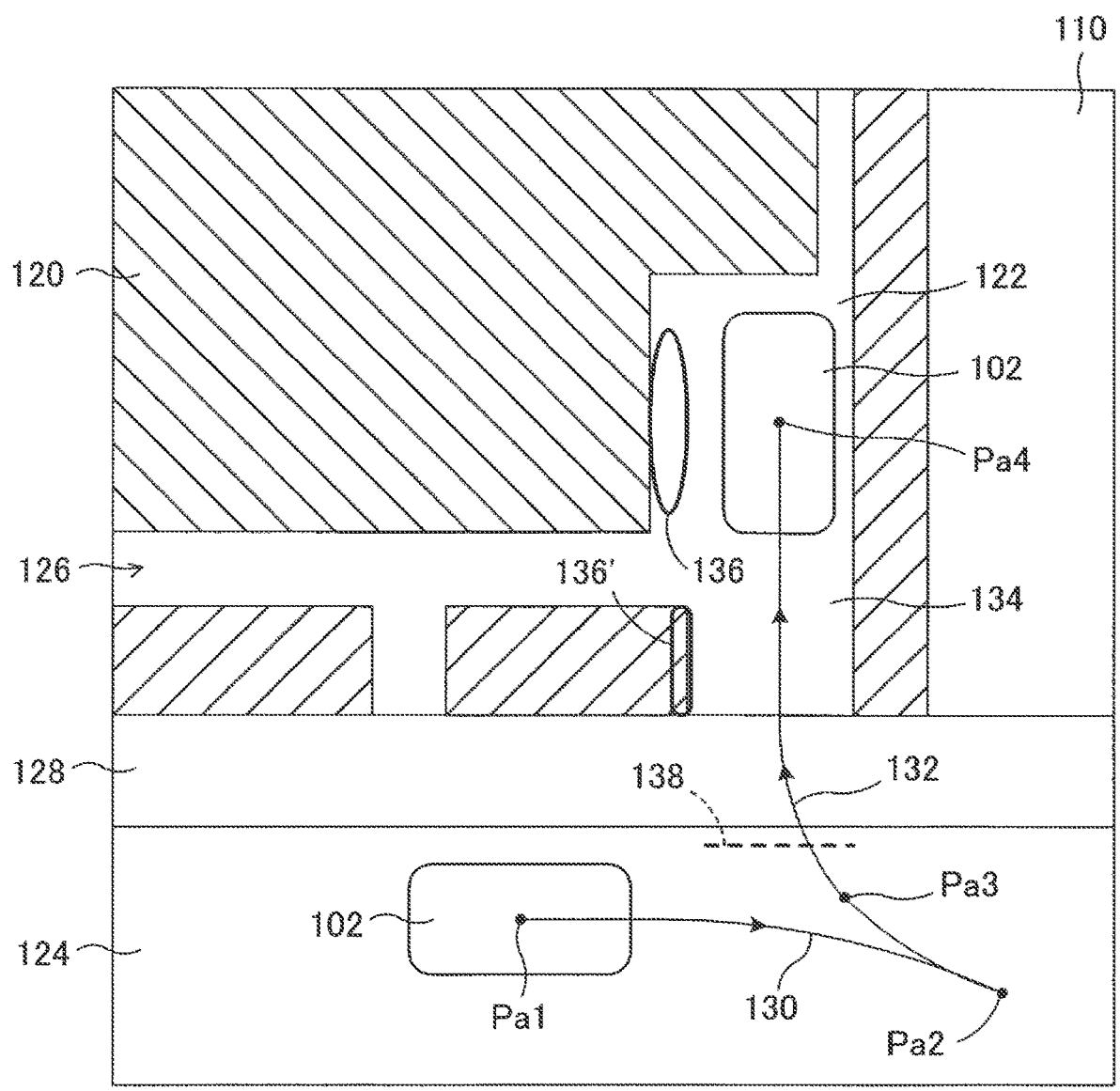
FIG. 11 is a view showing a relevant part of an all-around view for illustrating parking route storing control at the time when a driver drives a vehicle from a location in front of home and parks the vehicle in a car port in a forward facing position.

FIG. 11 is a view showing a relevant part of an all-around bird's eye view for illustrating parking route storing control at the time when the driver drives the vehicle 102 from a location in front of home 120 and park the vehicle 102 in a car port 122 in a forward facing position. A forward facing position is a position in which the vehicle 102 moves forward to exit. A rearward facing position is a position in which the vehicle 102 moves rearward to exit.

In FIG. 11, a downward-sloping hatched area represents the building of the home 120, and upward-sloping hatched areas represent areas where vehicles are not able to run, such as lawn and shrubbery. A non-hatched area is an area paved with concrete or the like so that vehicles are able to move and people are able to walk. There is a sidewalk 128 between a road 124 in front of the home 120 and a site 126 of the home, and the car port 122 is located to the side of the home 120 in the site 126 apart from the sidewalk. These pieces of information are information obtained by extracting feature points around the vehicle 102 by performing image analysis of the bird's-eye view image, and this also applies to FIG. 12 and FIG. 13 (described later).

In FIG. 11, as represented by routes 130, 132, the driver drives the vehicle 102 from the road 124 to the car port 122 via the sidewalk 128 and an approach 134. A location Pa1 indicates the location (reference location) of the vehicle 102 at the time when the park assist switch 13 is turned on, that is, a parking start location. A location Pa2 indicates a location at which the vehicle 102 is temporarily stopped to shift the travel direction of the vehicle 102 from forward to reverse. A location Pa3 indicates a location where the vehicle 102 is temporarily stopped to check for a pedestrian or the like. A location Pa4 indicates a parking location of the vehicle 102.

Thus, in FIG. 11, the vehicle 102 is moved forward along the route 130 from the location Pa1 to the location Pa2, and is moved rearward along the route 132 from the location Pa2 to a location Pa4 via a location Pa3. The routes 130, 132 are stored in the nonvolatile memory as parking routes.

A bicycle, a motorcycle, or the like can be parked in an area adjacent to the home 120 in the car port 122. The continuous line 136 represents a no entry area input by the driver so that the vehicle 102 does not interfere with a bicycle, a motorcycle, or the like. As described above, when the vehicle 102 moves from the road 124 to the sidewalk 128, it is necessary to check for a pedestrian or the like, so the dashed line 138 represents a temporary stop location input by the driver. The no entry area 136 and the temporary stop location 138 are also stored in the nonvolatile memory.

When the CPU is not able to detect an area in which the vehicle 102 is not able to run, by extracting feature points around the vehicle 102 through image analysis of the bird's-eye view image, a no entry area may be input by the driver as indicated by, for example, the continuous line 136' in FIG. 11.

Control in Target Route Setting Sub-Mode

Next, the control routine of the target route setting sub-mode according to the embodiment will be described with reference to the flowchart shown in FIG. 3. Control according to the flowchart shown in FIG. 3 is started when the target route setting icon 112 displayed on the touch panel display unit 22 is selected while the park assist switch 13 is on.

Initially, in step S312, the CPU acquires a bird's-eye view image from the PVM-ECU 20, and displays the bird's-eye view image on the touch panel display unit 22. The CPU determines whether the driver has input a target parking location and a parking position by using the bird's-eye view image. The driver may input a target parking location by touching the center of a desired area for parking, and the driver may input a parking position by touching a forward or backward arrow displayed at the target parking location.

In step S314, the CPU displays the target parking location (parking spot) and the parking position, input by the driver, in the bird's-eye view image and displays the cross arrow icons as in the case of step S234. When the driver has corrected the target parking location by using the cross arrow icons, the CPU corrects the target parking location to be displayed. When there is an obstacle in a spot of the input target parking location, the CPU corrects the target parking location around the obstacle.

In step S316, the CPU stores the parking start location (current location), the target parking location (when a correction has been performed, the corrected target parking location), and the parking position in the nonvolatile memory. The CPU, as in the case of step S216, extracts feature points around the vehicle 102 at the current location that is the parking start location and stores information on the feature points in the nonvolatile memory in association with information on the current location and position of the vehicle 102.

In step S318, the CPU displays "START" button in the bird's-eye view image and determines whether the driver has touched the "START" button. When the CPU makes negative determination, the CPU repeatedly executes step S318; whereas, when the CPU makes affirmative determination, the CPU proceeds with control in this sub-mode to step S320.

In step S320, the CPU sets a target parking route from the registration start location to the target parking location in accordance with a known procedure in the technical field. When the CPU determines in step S326 (described later) that the driver has input a no entry area, the CPU corrects the target parking route as needed.

In step S322, the CPU controls autonomous running of the vehicle 102 such that the vehicle 102 automatically moves along the target parking route (when the registered target parking route has been corrected, the corrected target parking route) toward the target parking location. In this case, when the driver has input a temporary stop in step S330 (described later), the vehicle 102 is temporarily stopped at a temporary stop location.

In step S324, the CPU, as in the case of step S316, extracts feature points around the vehicle 102 and stores information on the feature points in the nonvolatile memory in association with information on the current location and position of the vehicle 102.

In each of step S326, step S328, step S330, and step S332, the CPU executes similar control to that of a corresponding one of step S224, step S226, step S228, and step S230.

In step S334, the CPU determines whether the vehicle 102 has reached the target parking location (when the target parking location has been corrected, the corrected target parking location). When the CPU makes negative determination, the CPU returns control in this sub-mode to step S320; whereas, when the CPU makes affirmative determination, the CPU proceeds with control in this sub-mode to step S336.

In step S336, the CPU stops the vehicle 102 and moves the shift lever 72 to P position.

In each of step S338, step S340, step S342, and step S344, the CPU executes similar control to that of a corresponding one of step S234, step S236, step S238, and step S240.

Figure 12:
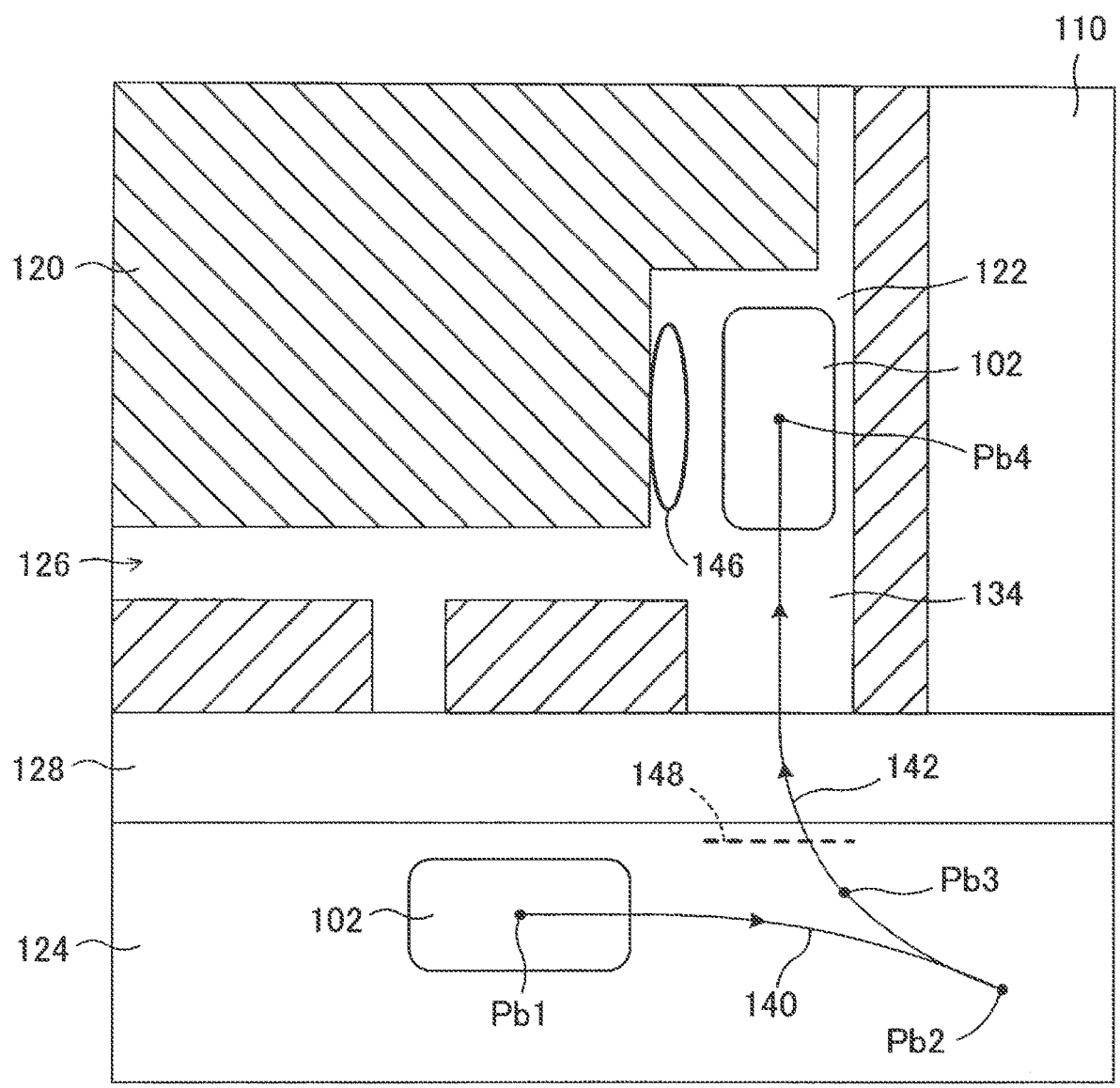
FIG. 12 is a view showing a relevant part of an all-around view for illustrating target parking route setting control at the time when a CPU causes the vehicle to move from a location in front of home and park in the car port in the forward facing position.

For example, FIG. 12 is a view showing a relevant part of an all-around bird's eye view for illustrating control that the CPU executes to set a target parking route for moving the vehicle 102 from a location in front of the home 120 and parking the vehicle 102 in the car port 122 in a forward facing position.

In FIG. 12, a location Pb1 indicates the location of the vehicle 102 at the time when the park assist switch 13 is turned on, that is, a parking start location. When the driver designates a target parking location Pb4 and a parking position, the CPU determines an area in which the vehicle 102 is movable, based on the feature points and the like around the vehicle 102 and generates target routes 140, 142 for moving the vehicle 102 from the parking start location Pb1 to the target parking location Pb4. The target routes 140, 142 are generated so that the vehicle 102 does not enter a no entry area 146 input by the driver.

A location Pb2 is a location at which the vehicle 102 is temporarily stopped to shift the travel direction of the vehicle 102 from forward to reverse. A location Pb3 is a location at which the vehicle 102 is temporarily stopped to check for a pedestrian or the like in accordance with a temporary stop location 148 set by the driver.

When the "START" button not shown in FIG. 12 is touched by the driver, the vehicle 102 is driven forward to the location Pb2 by autonomous driving, and is moved rearward from the location Pb2 to the target parking location Pb4 via the location Pb3. The vehicle 102 is temporarily stopped at the location Pb3, and movement is resumed after safety is checked.

Control in Stored Route Usage Sub-Mode

Next, the control routine of the stored route usage sub-mode according to the embodiment will be described with reference to the flowchart shown in FIG. 4. Control according to the flowchart shown in FIG. 4 is started when the stored route usage icon 113 displayed on the touch panel display unit 22 is selected while the park assist switch 13 is on.

Initially, in step S412, the CPU displays the bird's-eye view image on the touch panel display unit 22. The CPU determines whether the driver has input a target parking location by using the bird's-eye view image. When the CPU makes negative determination, the CPU repeatedly executes step S412: whereas, when the CPU makes affirmative determination, the CPU proceeds with control in this sub-mode to step S414.

In step S414, the CPU searches parking routes stored in the nonvolatile memory (referred to as "stored routes") for a stored route of which the current location of the vehicle 102 or a location near the current location is a target start location and the target parking location determined by the driver is a target parking location, and sets the found stored route as a target parking route.

In step S416, when the current location of the vehicle 102 deviates from the parking start location, the CPU corrects the target parking route according to the deviation. When the driver has input a no entry area in step S224 or there is an obstacle, the CPU corrects the target parking route as needed so that the vehicle 102 does not enter the no entry area or no collision occurs between the obstacle and the vehicle 102. After the driver designates a target parking route in the bird's-eye view image 115, the driver may correct the target parking route by touching and tracing on the bird's-eye view image along an intended route.

In step S418, the CPU determines whether the vehicle 102 is able to reach the target parking location. When the CPU makes negative determination, the CPU returns control in this sub-mode to step S416 and corrects the target parking route as needed; whereas, when the CPU makes affirmative determination, the CPU proceeds with control in this sub-mode to step S420. When the CPU makes negative determination in this step even when the target parking route is corrected a predetermined number of times, information indicating that park assist using stored routes is not possible may be displayed on the touch panel display unit 22, and control in this sub-mode may be ended.

In step S420, the CPU controls autonomous running of the vehicle 102 such that the vehicle 102 automatically moves along the target parking route (when the registered target parking route has been corrected, the corrected target parking route) toward the target parking location.

In step S422, the CPU, as in the case of step S316, extracts feature points around the vehicle 102 and stores information on the feature points in the nonvolatile memory in association with information on the current location and position of the vehicle 102.

In step S424, the CPU compares the feature points extracted in step S422 with the feature points stored in step S224 and corrects the target parking route as needed.

In step S426, the CPU determines whether the current location of the vehicle 102 is a temporary stop location. When the CPU makes negative determination, the CPU proceeds with control in this sub-mode to step S430; whereas, when the CPU makes affirmative determination, the CPU temporarily stops the vehicle 102 and resumes autonomous travel of the vehicle 102 after checking for safety therearound with the radar sensors 11 or the like.

In each of step S430 and step S432, the CPU executes similar control to that of a corresponding one of step S334 and step S336.

In step S434, the CPU displays on the touch panel display unit 22 information indicating that parking is complete, and turns off the park assist switch 13.

For example, it is assumed that the vehicle 102 is stopped at the location Pa1 or near the location Pa1 in FIG. 11 and the target parking location is set at the location Pa4 or near the location Pa4. The routes 130, 132 stored in the nonvolatile memory or a route close to the routes 130, 132 is set for the target parking route, and the target parking route is corrected as needed. The vehicle 102 is moved to a parking location through autonomous driving along the target parking route or the corrected target parking route.

In this case, the target parking route is set or corrected such that the vehicle 102 does not pass through the no entry areas 136, 136', so the vehicle 102 does not enter the no entry areas. When the vehicle 102 reaches the temporary stop location 138, the vehicle 102 is temporarily stopped and safety is checked, so the vehicle 102 does not adversely affect a pedestrian or the like.

Control in Target Route Usage Sub-Mode

Next, the control routine of the target route usage sub-mode according to the embodiment will be described with reference to the flowchart shown in FIG. 5. Control according to the flowchart shown in FIG. 5 is started when the target route usage icon 114 displayed on the touch panel display unit 22 is selected while the park assist switch 13 is on.

Initially, in step S512, the CPU displays the bird's-eye view image and the "START" button on the touch panel display unit 22. The CPU determines whether the driver has input a target parking location by using the bird's-eye view image. When the CPU makes negative determination, the CPU repeatedly executes step S512: whereas, when the CPU makes affirmative determination, the CPU proceeds with control in this sub-mode to step S514.

In step S514, the CPU searches stored routes stored in the nonvolatile memory for a stored route of which the current location of the vehicle 102 or a location near the current location is a target start location and a target parking location input by the driver or a location near the target parking location is a target parking location. The CPU sets the found stored route for the target parking route and displays the stored route in the bird's-eye view image on the touch panel display unit 22.

In step S516, when the current location of the vehicle 102 deviates from the parking start location, the CPU corrects the target parking route according to the deviation. When the target parking location deviates from the stored parking location, the CPU corrects the target parking route according to the deviation. After the driver designates a target parking route in the bird's-eye view image 115, the driver may correct the target parking route by touching and tracing on the bird's-eye view image along an intended route.

In step S518, when the driver has input a no entry area in step S326 or there is an obstacle, the CPU corrects the target parking route as needed so that the vehicle 102 does not enter the no entry area or no collision occurs between the obstacle and the vehicle 102.

In each of step S520, step S522, step S524, step S526, step S528, step S530, step S532, step S534, and step S536, the CPU executes similar control to that of a corresponding one of step S418, step S420, step S422, step S424, step S426, step S428, step S430, step S432, and step S434.

For example, it is assumed that the vehicle 102 is stopped at the location Pb1 or near the location Pb1 in FIG. 12 and the target parking location is set at the location Pb4 or near the location Pb4. The stored routes 140, 142 stored in the nonvolatile memory or a route close to the routes 140, 142 is set for the target parking route, and the target parking route is corrected as needed. The vehicle 102 is moved to a parking location through autonomous driving along the target parking route or the corrected target parking route.

In this case, the target parking route is set or corrected such that the vehicle 102 does not pass through the no entry area 146, so the vehicle 102 does not enter the no entry area. When the vehicle 102 reaches the temporary stop location 148, the vehicle 102 is temporarily stopped and safety is checked, so the vehicle 102 does not adversely affect a pedestrian or the like.

Control in Exit Route Storing Sub-Mode

Next, the control routine of the exit route storing sub-mode according to the embodiment will be described with reference to the flowchart shown in FIG. 6. Control according to the flowchart shown in FIG. 6 is started when an exit route storing icon displayed on the touch panel display unit 22 is selected while the exit assist switch 14 is on.

As is apparent from a comparison between FIG. 6 and FIG. 2, in each of step S612, step S614, step S616, step S618, step S620, step S622, step S624, step S626, step S628, step S630, and step S632, the CPU executes similar control to that of a corresponding one of step S212, step S214, step S216, step S218, step S220, step S222, step S224, step S226, step S228, step S230, and step S232. The current location of the vehicle 102 in step S614 and step S616 is a location where the vehicle is parked, that is, an exit start location. In step S620, the CPU acquires information on a moving route along which the driver drives the vehicle 102 from the exit start location toward the temporary stop location (exit end location), and stores the moving route in the nonvolatile memory. When the CPU makes negative determination in step S632, the CPU returns control in this sub-mode to step S620; whereas, when the CPU makes affirmative determination, the CPU proceeds with control in this sub-mode to step S634.

In step S634, the CPU determines whether the driver has turned off the exit assist switch 14. When the CPU makes negative determination, the CPU returns control in this sub-mode to step S632. In contrast, when the CPU makes affirmative determination, the CPU stores the exit start location, the temporary stop location, and the exit route (when a correction has been performed, the corrected exit route) in the nonvolatile memory in step S636.

Figure 13:
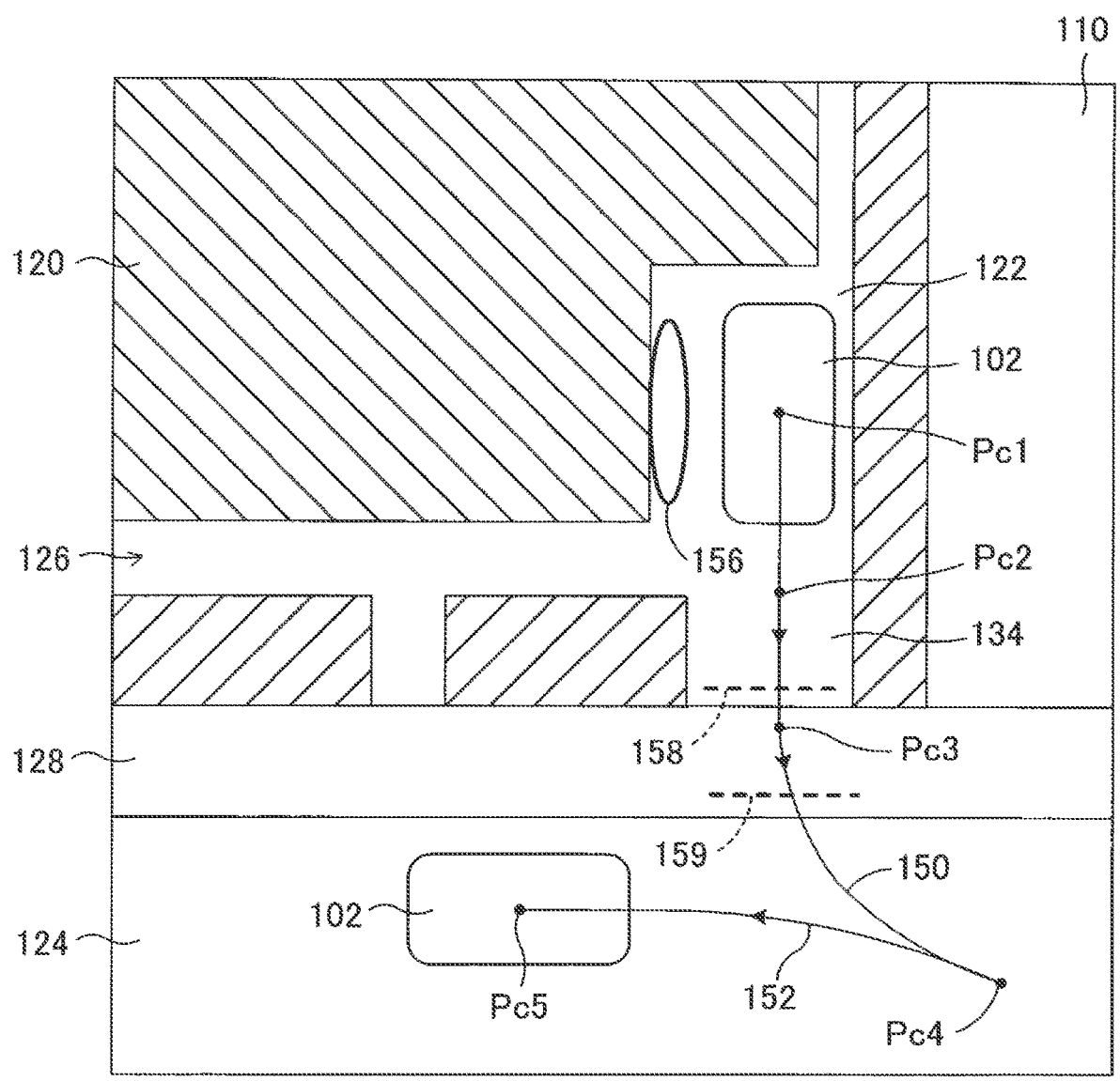
FIG. 13 is a view showing a relevant part of an all-around view for illustrating exit route storing control at the time when the driver drives the vehicle parked in a rearward facing position from the car port to a road in front of home.

For example, FIG. 13 is a view showing a relevant part of an all-around bird's eye view for illustrating exit route storing control at the time when the driver drives the vehicle 102 parked in a rearward facing position from the car port 122 to the road 124 in front of the home 120.

In FIG. 13, as represented by routes 150, 152, the driver drives the vehicle 102 from the car port 122 to the road 124 via the approach 134 and the sidewalk 128. A location Pc1 indicates the location of the vehicle 102 at the time when the exit assist switch 14 is turned on, that is, an exit start location. A location Pc2 indicates a location at which the vehicle 102 is temporarily stopped to check for a pedestrian or the like. A location Pc3 indicates a location at which the vehicle 102 is temporarily stopped to check for another vehicle or the like running on the road 124. A location Pc4 indicates a location at which the vehicle 102 is temporarily stopped to shift the travel direction of the vehicle 102 from forward to reverse. A location Pc5 indicates the exit end location of the vehicle 102.

Thus, in FIG. 13, the vehicle 102 is moved forward along the route 132 from the location Pc1 to the location Pc4 via the locations Pc2, Pc3, and is moved rearward along the route 132 from the location Pc4 to the location Pc5. The routes 150, 152 are stored in the nonvolatile memory as an exit route. The no entry area 156 and the temporary stop locations 158, 159, set by the driver, are also stored in the nonvolatile memory.

Control in Exit Route Usage Sub-Mode

Next, the control routine of the exit route usage sub-mode according to the embodiment will be described with reference to the flowchart shown in FIG. 7. Control according to the flowchart shown in FIG. 7 is started when an exit route usage icon displayed on the touch panel display unit 22 is selected while the exit assist switch 14 is on.

Initially, in step S712, the CPU displays the bird's-eye view image on the touch panel display unit 22. The CPU determines whether the driver has input a temporary stop location by using the bird's-eye view image. When the CPU makes negative determination, the CPU repeatedly executes step S712: whereas, when the CPU makes affirmative determination, the CPU proceeds with control in this sub-mode to step S714.

In step S714, the CPU searches the exit routes stored in the nonvolatile memory (stored routes) for an exit route of which the current location of the vehicle 102 or a location near the current location is the target start location and the temporary stop location is the target stop location, sets the found exit route for a target exit route, and displays the target exit route in the bird's-eye view image on the touch panel display unit 22.

In step S716, when the current location of the vehicle 102 deviates from the exit start location, the CPU corrects the target exit route according to the deviation. When the driver has input a no entry area in step S624 or there is an obstacle, the CPU corrects the target exit route as needed so that the vehicle 102 does not enter the no entry area and no collision occurs between the obstacle and the vehicle 102. After the driver designates a target exit route in the bird's-eye view image 115, the driver may correct the target exit route by touching and tracing on the bird's-eye view image along an intended route.

In step S718, the CPU determines whether the vehicle 102 is able to reach the temporary stop location. When the CPU makes negative determination, the CPU returns control in this sub-mode to step S716 and corrects the target exit route as needed; whereas, when the CPU makes affirmative determination, the CPU proceeds with control in this sub-mode to step S720.

In step S720, the CPU controls autonomous running of the vehicle 102 such that the vehicle 102 automatically moves along the target exit route (when the registered target exit route has been corrected, the corrected target exit route) toward the target stop location.

In step S722, the CPU, as in the case of step S316, extracts feature points around the vehicle 102 and store information on the feature points in the nonvolatile memory in association with information on the current location and position of the vehicle 102.

In step S724, the CPU compares the feature points extracted in step S722 with the feature points stored in step S622 and corrects the target exit route as needed.

In step S726, the CPU determines whether the current location of the vehicle 102 is a temporary stop location. When the CPU makes negative determination, the CPU proceeds with control in this sub-mode to step S730; whereas, when the CPU makes affirmative determination, the CPU temporarily stops the vehicle 102 and resumes autonomous travel of the vehicle 102 after checking for safety therearound.

In each of step S730 and step S732, the CPU executes similar control to that of a corresponding one of step S334 and step S336.

In step S734, the CPU displays on the touch panel display unit 22 information indicating that exit is complete and turns off the exit assist switch 14.

For example, it is assumed that the vehicle 102 is parked at the location Pc1 or near the location Pc1 in FIG. 13 and the temporary stop location is set at the location Pc5 or near the location Pc5. The stored routes 150, 152 stored in the nonvolatile memory or a route close to the routes 150, 152 is set for the target exit route, and the target exit route is corrected as needed. The vehicle 102 is moved to the temporary stop location through autonomous driving along the target exit route or the corrected target exit route.

In this case, the target exit route is set or corrected such that the vehicle 102 does not pass through the no entry area 156, so the vehicle 102 does not enter the no entry area. When the vehicle 102 reaches the temporary stop location 158 or the temporary stop location 159, the vehicle 102 is temporarily stopped and safety is checked, so the vehicle 102 does not adversely affect a pedestrian or the like.

In the example shown in FIG. 13, the exit route includes the exit route 152 along which the vehicle 102 reverses. Alternatively, the vehicle 102 may be subjected to exit control such that a selected location in forward movement is set for a temporary stop location.

Control in Parking Route Usage Sub-Mode

Next, the control routine of the parking route usage sub-mode according to the embodiment will be described with reference to the flowchart shown in FIG. 8. Control according to the flowchart shown in FIG. 8 is started when a parking route usage icon displayed on the touch panel display unit 22 is selected while the exit assist switch 14 is on.

As is apparent from a comparison between FIG. 8 and FIG. 7, in each of step S812, step S816, step S818, step S820, step S822, step S824, step S826, step S828, step S830, step S832, and step S834, the CPU executes similar control to that of a corresponding one of step S212, step S716, step S718, step S720, step S722, step S724, step S726, step S728, step S730, step S732, and step S734. Thus, the description of those steps is omitted.

In step S814, the CPU searches the parking routes stored in the nonvolatile memory for a parking route of which the current location of the vehicle 102 or a location near the current location is a target parking location and a temporary stop location or a location near the temporary stop location is a parking start location. The CPU sets the same route as the found parking route in an opposite direction for a target exit route and displays the target exit route in the bird's-eye view image on the touch panel display unit 22. Thus, in this sub-mode, the vehicle 102 is automatically moved along the found parking route in the direction opposite to the direction during parking.

For example, it is assumed that the vehicle 102 is parked at the location Pa4 or near the location Pa4 in FIG. 11 and the temporary stop location is set at the location Pa1 or near the location Pa1. The same route in the opposite direction as the parking routes 130, 132 stored in the nonvolatile memory or a route close to the parking routes 130, 132 is set for a target exit route, and the target exit route is corrected as needed. The vehicle 102 is moved to the temporary stop location through autonomous driving along the target exit route or the corrected target exit route.

In this case, the target exit route is set or corrected such that the vehicle 102 does not pass through the no entry areas 136, 136', so the vehicle 102 does not enter the no entry areas. As in the case of control in the exit route usage sub-mode (FIG. 7), the temporary stop locations 158, 159 may be set by the driver. In this case, the vehicle 102 is temporarily stopped at the temporary stop locations 158, 159 and safety is checked, so the vehicle 102 does not adversely affect a pedestrian or the like.

The example embodiments of the disclosure are described in detail above; however, the disclosure is not limited to the above-described embodiments. It is apparent to persons skilled in the art that various other embodiments may be implemented within the scope of the disclosure.

For example, in the above-described embodiment, a no entry area and a temporary stop location are set while the vehicle 102 is moving. Alternatively, a no entry area and a temporary stop location may be set before the vehicle 102 starts moving and/or the vehicle 102 stops moving.

In the above-described embodiment, both a no entry area and a temporary stop location are able to be set. Alternatively, setting of a temporary stop location may be omitted.

In the above-described embodiment, feature points around the vehicle 102 are extracted, and information on the feature points is stored in the nonvolatile memory in association with information on the current location and position of the vehicle 102. Alternatively, information on the position of the vehicle 102 may be omitted. When the driving assist system of the embodiment of the disclosure is applied to parking and exiting in a frequently used place, such as home, as in the case of the embodiment, information on the current location and position of a vehicle may be omitted.

In the above-described embodiment, movement of the vehicle 102 during parking and during exit is performed by autonomous driving. Alternatively, at least one of driving force control, braking force control, and the steering angle of the steered wheels may be performed by the driver.

In the above-described embodiment, the controller is configured to execute both park assist control and exit assist control. Alternatively, one of park assist control and exit assist control may be omitted. At least one of the above-described sub-modes may be omitted.

In FIG. 11 to FIG. 13, the moving direction of the vehicle 102 is switched on the road 124. Alternatively, the moving direction may be switched in the site 126 of the home or switch of the moving direction may be omitted.

What is claimed is:

1. A vehicle driving assist system comprising:
    multiple cameras each configured to capture an image around a vehicle;
    a controller configured to generate a bird's-eye view image based on information on the images around the vehicle, respectively captured by the cameras, and acquire a target route from a current location of the vehicle to a target stop location set by a driver; and
    a display configured to display the bird's-eye view image and the target route, wherein:

the controller is configured to, when the driver issues a command to move the vehicle to the target stop location, assist the vehicle in moving to the target stop location along the target route and stopping at the target stop location;

the display is configured to be able to allow the driver to use the bird's-eye view image to set a no entry area where entry of the vehicle is prohibited; and the controller is configured to, when the controller determines that the vehicle enters the no entry area if the vehicle moves along the target route, correct the target route such that the vehicle does not enter the no entry area and assist the vehicle in moving to the target stop location along the corrected target route and stopping at the target stop location.

2. The vehicle driving assist system according to claim 1, wherein:

the display is configured to be able to allow the driver to use the bird's-eye view image to set a temporary stop location where the vehicle is temporarily stopped; and the controller is configured to, when the vehicle moves along the target route and the controller determines that the vehicle has reached the temporary stop location, cause the vehicle to stop at the temporary stop location and check for safety based on at least the information on the images around the vehicle.

3. The vehicle driving assist system according to claim 1, wherein the controller includes a storage device configured to store at least one route along which the vehicle moves in accordance with driving of the driver, and is configured to acquire, of the at least one route stored in the storage device, a route corresponding to a route from the current location of the vehicle to the target stop location as the target route.

4. The vehicle driving assist system according to claim 1, wherein the controller is configured to extract feature points based on the information on the images around the vehicle, respectively captured by the cameras, and acquire the target route by generating the target route from the current location of the vehicle to the target stop location based on the feature points.

5. The vehicle driving assist system according to claim 1, wherein:

the target stop location is a target parking location; and the controller is configured to assist the vehicle in moving from the current location to the target parking location along the target route and parking at the target parking location.

6. The vehicle driving assist system according to claim 1, wherein:

the current location of the vehicle is a parking location;

the target stop location is a temporary stop location; and the controller is configured to assist the vehicle in moving from the parking location to the temporary stop location along the target route and stopping at the temporary stop location.

* * * * *